United States Patent
Ballard et al.

(10) Patent No.: US 6,261,612 B1
(45) Date of Patent: Jul. 17, 2001

(54) MICROWAVE BROWNABLE POTATO TOPPINGS

(75) Inventors: Beverly J. Ballard, Glassboro; Harold C. Hayes, Haddon Heights, both of NJ (US)

(73) Assignee: Vlasic Foods International, Inc., Cherry Hill, NJ (US)

( * ) Notice: Subject to any disclaimer, the term of this patent is extended or adjusted under 35 U.S.C. 154(b) by 0 days.

(21) Appl. No.: 09/468,120

(22) Filed: Dec. 21, 1999

(51) Int. Cl.$^7$ ............... A23L 1/10; A23L 1/216; A23L 1/272
(52) U.S. Cl. ............ 426/94; 426/102; 426/103; 426/268; 426/302; 426/637
(58) Field of Search ............... 426/89, 102, 103, 426/302, 262, 268, 305, 637, 94

(56) References Cited

U.S. PATENT DOCUMENTS

| | | |
|---|---|---|
| 4,190,757 | 2/1980 | Turpin et al. . |
| 4,229,483 | 10/1980 | Oura et al. . |
| 4,252,832 | 2/1981 | Moody . |
| 4,267,420 | 5/1981 | Brastad . |
| 4,315,035 | 2/1982 | Basa et al. . |
| 4,448,791 | 5/1984 | Fulde et al. . |
| 4,518,618 | 5/1985 | Hsia et al. . |
| 4,641,005 | 2/1987 | Seiferth . |
| 4,735,812 | 4/1988 | Bryson et al. . |
| 4,882,184 | 11/1989 | Buckholz et al. . |
| 4,886,659 | 12/1989 | Baines et al. . |
| 4,904,490 | 2/1990 | Buckholz, Jr. et al. . |
| 4,917,907 | 4/1990 | Kwis et al. . |
| 4,929,455 | 5/1990 | Connaughton, Jr. et al. . |
| 4,943,697 | 7/1990 | Buckholz, Jr. et al. . |
| 4,963,376 | 10/1990 | Nafisi-Movaghar . |
| 4,968,522 | 11/1990 | Steinke et al. . |
| 4,985,261 | 1/1991 | Kang et al. . |
| 5,002,789 | 3/1991 | Graf et al. . |
| 5,043,173 | 8/1991 | Steinke et al. . |
| 5,059,434 | 10/1991 | Kang et al. . |
| 5,069,916 | 12/1991 | Buckholz et al. . |
| 5,073,392 | 12/1991 | Atwell et al. . |
| 5,075,528 | 12/1991 | Kang et al. . |
| 5,089,278 | 2/1992 | Haynes et al. . |
| 5,091,200 | 2/1992 | Kang et al. . |
| 5,108,770 | 4/1992 | Domingues et al. . |
| 5,118,514 | 6/1992 | Adams et al. . |
| 5,139,800 | 8/1992 | Anderson et al. . |
| 5,196,219 | 3/1993 | Hsu et al. . |
| 5,223,289 | 6/1993 | Domingues et al. . |
| 5,258,194 | 11/1993 | Anderson et al. . |
| 5,286,504 | 2/1994 | Sheen et al. . |
| 5,292,541 | 3/1994 | Underwood et al. . |
| 5,389,759 | 2/1995 | Jay et al. . |
| 5,397,582 | 3/1995 | Underwood et al. . |
| 5,458,898 | 10/1995 | Kamper et al. . |
| 5,756,140 | 5/1998 | Shoop et al. . |

FOREIGN PATENT DOCUMENTS

| | | | |
|---|---|---|---|
| 0211036 | 6/1984 | (DE) . | |
| 0203725 | 12/1986 | (EP) . | |
| 0284186 | 9/1988 | (EP) . | |
| 60-27358 | * 2/1985 | (JP) | ............ 426/637 |
| 90/012513 | 11/1990 | (WO) . | |
| 92/007477 | 5/1992 | (WO) . | |

OTHER PUBLICATIONS

Copson, David A., et al., "Browning Methods in Microwave Cooking," *Agricultural and Food Chemistry*, 3:424–427 (1955).

* cited by examiner

*Primary Examiner*—Arthur L. Corbin
(74) *Attorney, Agent, or Firm*—Brobeck, Phleger & Harrison, LLP

(57) ABSTRACT

The present invention relates to mashed potato products that are provided, in at least a top portion, with a browning agent that causes the product to achieve a pleasing golden brown color upon heating in either a microwave or conventional oven. The product can be a mashed potato topped pot pie.

11 Claims, No Drawings

MICROWAVE BROWNABLE POTATO TOPPINGS

BACKGROUND OF THE INVENTION

1. Field of the Invention

The present invention relates to mashed potato compositions which brown in a conventional oven or microwave and methods of their preparation. The present invention further relates to pies which are topped with such mashed potato compositions.

2. Description of the Background

Microwave ovens have become common appliance in most American households. In today's fast paced society, the savings in cooking time that microwaves afford over conventional ovens have made them an appliance of choice for meal preparation. In particular, microwave ovens are most commonly used to reheat foods, to defrost and/or cook frozen prepared and packaged foods. One of the most common of these frozen packaged foods consumed by Americans is pot pie, generally containing meat in a flour dough.

One of the largest drawbacks in microwave cooking is that foods, even when fully cooked, do not exhibit a fully developed "oven-browned" color. This is a particular problem with microwave cooked pies because consumers expect a pie to have a golden brown color and a certain slightly crispy texture when cooked. Instead, microwave cooked pies tend to have a dull grayish appearance which is generally unpalatable to the average consumer. To overcome these drawbacks, food manufacturers have developed various chemical techniques, food coloring and packaging configurations to help foodstuffs cooked in a microwave achieve a similar golden brown color and crisp texture associated with conventional oven cooking.

The most common reaction responsible for surface browning during cooking is the Maillard reaction (non enzymatic browning) between naturally occurring reducing sugars and compounds containing an amino acid group, e.g. amino acids, peptides and, proteins which results in the formation of colored melanoidins. Maillard reaction rates are increased with an increase in temperature, pH, concentration of Maillard reactants, water activity, oxygen supply, and nature of the raw materials among other factors. When a foodstuff is cooked in a conventional oven, the surface of the foodstuff is heated to considerably higher temperatures than the interior layers of the foodstuff, with the high surface temperatures being sufficient to achieve browning.

In microwave cooking, however, heat energy is released internally within the food so that the surface and interior remain at relatively similar temperatures. Consequently, the high surface temperatures necessary to achieve conventional oven type browning are not reached within the time required to cook a foodstuff in the microwave. To achieve the golden brown color of microwave cooking, food manufacturers have generally developed ways to treat the surfaces of various foodstuffs with browning agents. Some of these browning agents are either prereacted or partially reacted and applied like a sauce to foodstuffs to give them a golden brown appearance even before the food is cooked. This effect is enhanced during cooking. Other, more modern browning agents help induce the Maillard reaction at lower temperatures and faster cooking times by adjusting the other variables, such as pH and Maillard reactant concentration, to enhance browning at the surface of a foodstuff during microwave cooking.

An aqueous syrup containing a melted, caramelized, and foamed disaccharide, alone or in combination with a minor amount of monosaccharide has been described as a browning agent for foods cooked in a microwave oven. U.S. Pat. No. 4,252,832. This aqueous syrup is first heated until it produces a dark syrupy composition, mixed with salt, then brushed onto foods such as meats, poultry, fish, cakes, pies, or french-fry cut potatoes to give them a golden brown color even when they are cooked in a microwave.

A browning agent containing food starting materials and at least one carbohydrate having beta configuration has been described for use as a sauce base or meat flavor concentrate. The browning agent is prepared by heating hexose, glucose, or disaccharides having a beta-configuration with a food starting material such as potatoes, milled cereals, meat, bone, milk products, etc. at 100–200° C. for 10–30 minutes. The product undergoes a Maillard reaction during heating and the resulting brown colored browning agent can be used as a starting material for various uses such as a sauce base.

A browning agent containing a water-in-oil emulsion, a surfactant, and an edible base in an aqueous phase has been described for browning foodstuffs having a carbonyl containing browning reactant. U.S. Pat. No. 4,968,522. The emulsion can be coated onto pizza, pot pie doughs, Tatertots®, and hashbrowns. The water-in-oil emulsion prevents the edible base from contacting the carbonyl containing browning reactant in the foodstuff until the foodstuff is heated in a microwave or conventional oven. When this browning agent is subjected to heat, the edible base is released from the emulsion causing the pH of the surface of a foodstuff to increase, thereby inducing the browning reaction.

A browning composition for microwave foodstuffs obtained by spray drying a solution containing reducing sugar and milk protein has also been described. U.S. Pat. No. 5,196,219. The browning composition is produced by hydrolyzing an aqueous solution of milk solids, such as skim milk, evaporated skim milk and reconstituted non-fat dry milk, with lactase enzyme to convert substantially all of the lactose in the solution to glucose and galactose, and spray drying the hydrolyzed milk solids solution. During spray drying, Amadori rearrangement products, which are intermediary compounds in the formation of colored Maillard reaction products, are formed in the spray dried product. The spray dried product is reconstituted with water and coated onto the surface of a foodstuff, preferably the uncooked dough crust of a meat or fruit pie. Upon heating the coated foodstuff with microwave radiation, a desirable browned surface is developed on the crust during the time normally required to bake the pie, due to the formation of colored Maillard reaction products in the coating composition at microwave temperatures.

A bottom crust for a pie having a raw dough base containing a reducing sugar and an amino acid source to induce a Maillard-type browning reaction and caramelization browning during microwave exposure has also been described. U.S. Pat. No. 4,917,907. A preferred bottom crust contains a reducing sugar such as dextrose, an amino acid source such as whey solids, a dough conditioner to prevent dough shrinkage and a leavening agent to enhance browning and to provide a puffy crust. Pies made with this bottom crust are placed into a tray which is composed of a microwave-interactive material. Maillard-type browning reactions occur upon exposure of the bottom crust dough to microwave energy which causes water in the dough to become heated which in turn causes the dough to become heated. Caramelization browning reactions occur due to heat conducted from the tray into the bottom crust dough, which additionally gives the dough a crispier texture. A pie made with this bottom crust may also comprise a top crust dough. The top crust dough preferably has a laminate structure comprising a conventional dough coated with a reactive dough of a composition similar to the bottom crust dough.

Currently available browning agents and products containing browning agents have greatly increased the palatability of microwave cooked foodstuffs. There is a need, however, to improve the appearance, texture, and taste of microwaveable foodstuffs even further. This need is particularly felt in the area of frozen meat pies, one of the most commonly purchased frozen food items in the United States. Meat pies, commonly known as pot pies, require a long amount of time for proper conventional oven cooking, making the microwave a preferred option for cooking this foodstuff. Unfortunately, even with the various browning agents and additives currently being added to make pot pies more appetizing out of the microwave, most microwaved pot pies have a less appetizing dough color, texture, or flavor than those cooked in a conventional oven.

SUMMARY OF THE INVENTION

The present invention is directed to mashed potato compositions which are treated with a browning agent comprising at least one Maillard reactant, preferably a reducing sugar. These mashed potato compositions preferably comprise a milk product. The carbonyls within the potatoes and the amino acids within the milk product react with the browning agent which has been added to the surface of the potato composition to give the potato composition an appealing golden brown color after heating in the microwave.

The present invention is also directed to pies, preferably meat and/or vegetable pot pies, which are topped with a mashed potato composition as described above instead of a traditional top flour dough crust. The mashed potato compositions of the present invention provide a pleasant creamy texture and stark background color contrast to the golden brown color produced by the browning agent, making the resulting pie an attractive alternative to the traditional flour dough topped pies in both appearance and taste. The mashed potato composition topping also allows for a desirable appearance no matter the power and type of microwave or conventional oven used to cook the pie. Additionally, the mashed potato composition topped meat pies of the present invention provide consumers with a palatable looking and tasting product which includes both meat and potatoes, a favorite combination particularly of American consumers.

In one embodiment of the present invention, a mashed potato composition may comprise milk solids, cheese, spices and seasonings, preservatives, additives, or a combination thereof. The mashed potato composition is preferably made from a precooked, dehydrated mashed potato product that is rehydrated in the final product processing before packaging. Of course any other source of mashed potato compositions can be employed. Once prepared, e.g., by rehydration, the precooked composition is coated with a browning agent. The browning agent may be any browning agent commonly used in the manufacture of frozen prepackaged foods which may be cooked in a microwave oven. Preferably, the browning agent is a reducing sugar, combination of reducing sugars, or a composition derived from a sugar or starch, such as MAILLOSE™ Natural Browning Agent sold by Red Arrow Products Co.

The mashed potato composition of the present invention may be produced by mixing or blending cooked or partly cooked potatoes with various additional ingredients, cooling the resulting mixture, treating the composition with a topical spray coating comprising a browning agent, and freezing the composition. The additional ingredients may be added to the potatoes before, during, or after the cooking process. Likewise, the composition may be treated with a browning agent before or after the composition is frozen.

The mashed potato composition of the present invention may be individually frozen for sale as a separate side dish, or may be added as a side dish to a conventional frozen dinner entree. When the mashed potato composition of the present invention is heated in either a conventional oven for greater than 30 minutes, or in a microwave oven for about 8 to 10 minutes, the coated surface of the mashed potato composition becomes a very pleasing golden brown color.

In one embodiment of the present invention, a pie is topped with a mashed potato composition as described above. The pie may have a filling portion comprising meat, poultry, fish, vegetables, starches, sauces, seasonings, preservatives, and/or any other pie fillings which are commonly palatably consumed with mashed potatoes. In another embodiment, a mashed potato composition topped pie of the present invention may comprise a flour-based dough bottom crust, a bread or crumbled bread bottom crust, or no bottom crust at all. When the mashed potato composition topped pie of the present invention is heated to a temperature about 120° F. in an oven set at 400° F. for about 50 minutes or in a microwave set at full power for about 8 to 10 minutes, the filling portion becomes heated properly throughout and the mashed potato composition becomes a very pleasing golden brown color.

A mashed potato composition topped pie of the present invention may further be packaged in a container comprising a microwave-interactive material such as a metalized layer of polyester film or any other commonly used material. See U.S. Pat. Nos. 4,190,757, 4,641,005, and 4,917,907. The microwave-interactive material may be present in the top of a pie container so that the mashed potato composition topping of the pie will receive additional heat during microwave cooking, resulting in an even deeper golden brown color and a slight crispiness. The microwave-interactive material may additionally be present throughout the pie container to impart additional color and texture to any bottom crust materials.

Other objects, advantages, and embodiments of the invention are set forth in part in the description which follows, and in part, will be obvious from this description, or may be learned from the practice of the invention.

DESCRIPTION OF THE INVENTION

The present invention is directed to mashed potato compositions which are treated with a browning agent, methods of producing such compositions, and pie toppings comprising such compositions. In one embodiment of the present invention, a mashed potato composition may comprise: potatoes of any variety and size appropriate for cooking and consumption; water; a dairy product or combination of dairy products such as milk solids from skim milk, evaporated skim milk, or reconstituted nonfat dry milk, whey powder, whey solids, or various cheese products; seasonings such as salt, pepper, sugar, onions, chives, or garlic powder; preservatives; any additional ingredients commonly added to frozen foodstuffs; and any combination thereof. Among the traditional food preservatives that can be advantageously employed are BHA/BHT, citric acid, acetic acid, tocopherols, sodium chloride, sodium nitrate, TBHQ, disodium EDTA, propyl gallate, lactic acid producing bacteria, sodium tripolyphosphate, stearyl citrate, sugars, nitrogen, ascorbic acid, sodium citrate, potassium sorbate, sorbic acid, calcium proponate, and the like. In another embodiment of the present invention, a mashed potato composition may also comprise various vegetables, meats, or other ingredients commonly combined with mashed potatoes such as broccoli, mushrooms, or crumbled bacon.

The mashed potato composition of the present invention is treated with a browning agent to enhance browning of the composition when it is heated in a microwave or conventional oven. The browning agent may be any browning agent commonly used in the manufacture of frozen foods including, but not limited to, amino acids, reducing sugars such as dextrose, maltose, fructose, lactose, and hydroxyacetaldehyde, mono- and di-saccharides, rhamnose, ribose, edible bases, or any combination thereof. The browning agent may additionally comprise an oil-in-water emulsion as described in U.S. Pat. No. 4,968,522 or encapsulating agents such as liposomes or waxes (see U.S. Pat. Nos. 5,089,278 and 5,091,200)to prevent the browning agent from reacting with the surface of the mashed potato composition until it is subjected to heat. In the preferred mashed potato composition embodiment of the present invention, the browning agent is a composition derived from a sugar or starch, commercially available as MAILLOSE™ from Red Arrow Products Co.

The browning agent should be present in an amount sufficient to effect the desired browning development on the mashed potato product. In general, depending on the nature of the particular browning agent employed, the desired browning effect can be achieved by using from about 0.1% to about 10%, and preferably from 0.1% to 1.0%, by weight of the browning agent based on the weight of mashed potato composition. Lower relative amounts can be used when coating only the top surface of product with substantial thickness. The most preferred browning agent MAILLOSE™, is advantageously employed as a 35% solution and can be added at about 2 grams per 140–150 grams of mashed potato.

The present invention is also directed to pies, preferably meat and/or vegetable pot pies, which are topped with a mashed potato composition as described above instead of a traditional top flour dough crust. The mashed potato compositions of the present invention provide a pleasant creamy texture and stark background color contrast to the golden brown color produced by the browning agent, making the resulting pie both appear and taste more palatable than the traditional flour dough topped pies. The mashed potato composition topping also allows for more desirable appearance than conventional dough toppings no matter the power and type of microwave or conventional oven used to cook the pie. Additionally, the mashed potato composition topped meat pies of the present invention provide consumers with a palatable looking and tasting product which includes both meat and potatoes, a favorite combination particularly of American consumers.

In one embodiment of the present invention, a mashed potato composition may comprise milk solids, cheese, bacon, chives, spices and seasonings, preservatives, additives, or a combination thereof. The mashed potato composition of the present invention may be produced by mixing or blending cooked or partly cooked potatoes with various additional ingredients such as described above, and cooling the resulting composition. The additional ingredients may be added to the potatoes before, during, or after the cooking process. The cooled composition is treated with a browning agent either before or after the mashed potato composition is frozen. The browning agent may be brushed onto the surface of the mashed potato composition, mixed with a portion of the mashed potato composition and this portion may then be layered onto the remaining composition, or spray coated onto the surface of the mashed potato composition. In the preferred embodiment, a liquid product is prepared by diluting MAILLOSE™ in water to form a solution having about 20–50%, preferably about 35% MAILLOSE™. The resulting solution is coated, e.g., by spraying onto the top of the mashed potato composition. The mashed potato composition of the present invention may be individually frozen for sale as a separate side dish, or may be added as a side dish to a conventional frozen dinner entree.

In one embodiment of the present invention, a pie is topped with a mashed potato composition as described above. The pie may have a filling portion comprising meat, poultry, fish, vegetables, starches, sauces, seasonings, preservatives, and/or any other pie fillings which are commonly palatably consumed with mashed potatoes. In another embodiment, a mashed potato composition topped pie of the present invention may comprise a flour-based dough bottom crust, a bread or crumbled bread bottom crust, or no bottom crust at all. When the mashed potato composition topped pie of the present invention is cooked in a 400 F oven for about 50 minutes or in a microwave for about 8 to 10 minutes at high power, the filling portion becomes heated through properly and the mashed potato composition becomes a very pleasing golden brown color.

A mashed potato composition topped pie of the present invention may further be packaged in a container comprising a microwave-interactive material such as a metalized layer of polyester film or any other commonly used material. See U.S. Pat. Nos. 4,190,757, 4,641,005, and 4,917,907. The microwave-interactive material may be present in the top of a pie container so that the mashed potato composition topping of the pie will receive additional heat during microwave cooking, resulting in an even deeper golden brown color and a slight crispiness. The microwave-interactive material may additionally be present throughout the pie container to impart additional color and texture to any bottom crust materials.

The following examples are given to illustrate preferred embodiments of this invention and are not intended to limit the invention in any way. It should be understood that this invention is not limited to the above-mentioned embodiments. Numerous modifications can be made by one skilled in the art having the benefits of the teachings given here. Such modifications should be taken as being encompassed within the scope of the present invention as set forth in the appended claims.

EXAMPLES

The following example further describes and demonstrate embodiments within the scope of the present invention. The examples is given solely for the purpose of illustration and are not to be construed as limitations of the present invention, as many variations thereof are possible without departing from the spirit and scope of the invention.

Example 1

This Example describes the preparation of 12 oz. frozen chicken pot pie according to the present invention. A bottom pie dough crust of convention composition was prepared and filled with chicken, chicken gravy and a slurry of vegetables of the type normally used in preparing frozen pot pie products. A mashed potato product separately prepared by mixing dehydrated potato flakes (a mixture of ⅜" and ⅝" flakes) with conventional ingredients such as whole milk powder, butter and/or margarine, salt and methylcellulose. 145 grams of the mashed potato composition was then dispensed on the top surface of the pot pie. The mashed potato-topped pie was then passed under an atomizer which applied as a thin mist about 2 grams of 35% MAILLOSE™ spray to the top of the mashed potato topping surface. The resulting product was then placed into a carton having an upper surface susceptor board made by Fort James Company and frozen using conventional commercial freezing conditions.

Upon heating this product in a microwave oven for about 8 to 10 minutes at high power level, the resulting product has a pleasing golden brown appearance and a slightly crispy surface texture.

Other embodiments and uses of the invention will be apparent to those skilled in the art from consideration of the specification and practice of the invention disclosed herein. All documents referenced herein are specifically and entirely incorporated by reference. The specification and examples should be considered exemplary only with the true scope and spirit of the invention indicated by the following claims. As will be easily understood by those of ordinary skill in the art, variations and modifications of each of the disclosed embodiments can be easily made within the scope of this invention as defined by the following claims.

We claim:

1. A foodstuff comprising:
    a body portion; and
    a top portion covering said body portion and comprising a potato topping coated with a browning agent;
    whereby said top portion browns upon exposure to microwave radiation or heat from a conventional oven.

2. A pot pie comprising:
    a flour-based dough bottom crust;
    a filling portion; and
    a potato topping positioned above said filling portion, said potato topping being coated with a browning agent;
    whereby the potato topping of said pot pie browns upon exposure to microwave radiation or heat from a conventional oven.

3. The product of claim 1 or 2 wherein said browning agent comprises reducing sugars.

4. The product of claim 1 or 2 wherein said potato topping comprises mashed potatoes.

5. The product of claim 1 or 2 wherein said potato topping contains an additive selected from the group consisting of cheese, chives, bacon, spices, flavorings, and mixtures thereof.

6. The product of claim 1 or 2 further comprising a microwave interactive element that facilitates the browning upon heating in a microwave oven.

7. A process for making a foodstuff, said process comprising the steps of:
    providing a body portion for the foodstuff;
    providing a potato topping for the foodstuff;
    covering the body portion of the foodstuff with the potato topping; and
    coating the potato topping with a browning agent.

8. A process for making a microwave brownable pot pie, said process comprising the steps of:
    providing a pot pie body portion comprising
        a flour-based bottom crust and a pie filling;
    covering the pot pie body portion with a potato topping; and
    coating the potato topping with a browning agent.

9. The process of claim 7 or 8 wherein said browning agent comprises reducing sugars.

10. The process of claim 7 or 8 wherein said potato topping comprises mashed potatoes.

11. The process of claim 7 or 8 wherein said potato topping contains an additive selected from the group consisting of cheese, chives, bacon, spices, flavorings, and mixtures thereof.

* * * * *